Feb. 23, 1937.  A. K. KUSEBAUCH  2,071,750
PIPE COUPLING GASKET
Filed June 7, 1935
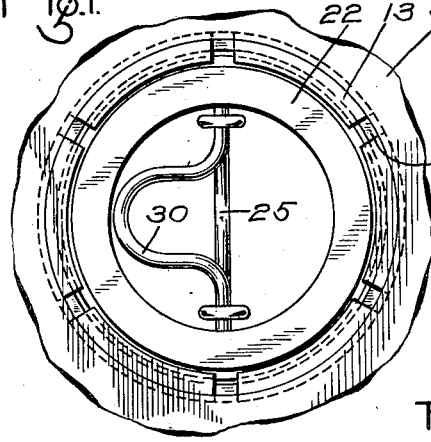
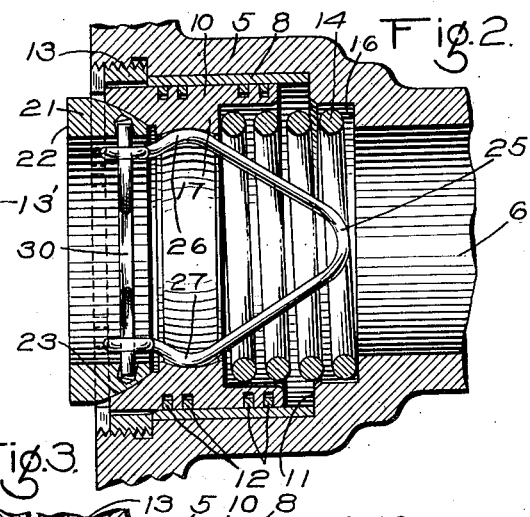
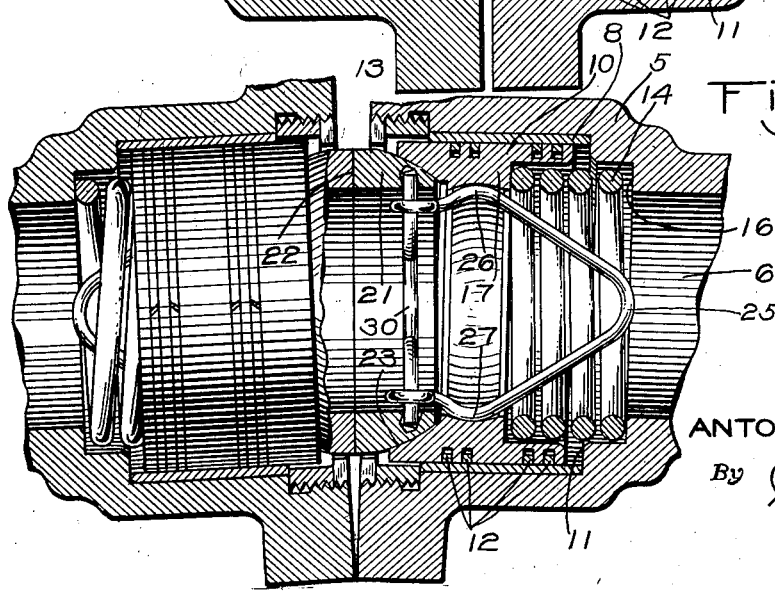
INVENTOR.
ANTON K. KUSEBAUCH
By *Wm. M. Cady*
ATTORNEY.

Patented Feb. 23, 1937

2,071,750

UNITED STATES PATENT OFFICE 2,071,750

PIPE COUPLING GASKET

Anton K. Kusebauch, Bellevue, Pa., assignor to The Westinghouse Air Brake Company, Wilmerding, Pa., a corporation of Pennsylvania Application June 7, 1935, Serial No. 25,391

2 Claims. (Cl. 285—69)

This invention relates to gaskets, and more particularly to gaskets of the oscillating type for use in fluid pressure apparatus.

The gaskets used in counterpart couplings employed between the adjacent cars of a train for connecting the train pipes for conducting fluids under pressure throughout a train are liable to be imperfectly aligned or subjected to flexing when coupled together, such as might be produced by relative movement or play between the connected coupling heads. Under these conditions, leakage of fluid under pressure is apt to develop between the seating faces of the gaskets, due to their inability to maintain a seal when improperly aligned.

It has heretofore been proposed to provide a gasket of the oscillating type, comprising a seating ring having a curved rear face formed as a segment of a sphere and adapted to rock in a spherical recess formed in the coupling head. Although such a gasket acts in some measure to compensate for improper alignment of the coupling heads, its sealing action is liable to be inadequate, especially when wear has reduced the coupling pressure on the seating faces or in case of a relatively wide angle between the longitudinal lines of the connected couplers.

The principal object of my invention is to provide an improved gasket assembly, so as to obviate the above difficulties.

In the accompanying drawing, Fig. 1 is a face view of a portion of a coupling head carrying a gasket assembly constructed according to the invention; Fig. 2 is a sectional view of the portion of the coupling head and gasket assembly shown in Fig. 1; Fig. 3 is a fragmentary sectional view of a pair of coupling heads carrying gasket assemblies of the type shown in Fig. 2, coupled together, and in normal alignment; and Fig. 4 is a view similar to Fig. 3 but with the coupling heads shown slightly out of alignment.

As shown in the drawing, a coupling head 5 is provided, adapted to be coupled to a counterpart coupling head by suitable coupling means (not shown), and having a fluid passage 6. According to the invention, the coupling head 5 is provided with a bore adjacent the conduit opening, in which is secured a bushing 8, and slidably mounted in said bushing is a sleeve member or hollow piston 10, which may be moved inwardly a distance limited by engagement with a shelf-like stop 11 formed within the coupling head at the inner end of the bushing.

The hollow piston 10 is provided with exterior annular grooves adapted to receive piston rings 12 which resiliently engage the wall of the bushing 8 for ensuring against leakage of fluid between the piston and bushing. An annular nut 13 is provided, having screw-threaded engagement with a tapped portion of the coupler head conduit opening, and adapted to engage the circumferential edge of the piston 10 for limiting outward movement of said piston in its bushing. The annular nut 13 has radial slots 13' for facilitating assembly. A spring 14 is disposed within the conduit opening of the coupling head between a shoulder 16 formed on the interior wall of said coupling head and an interior annular collar portion 17 of the hollow piston 10 for urging said piston outwardly and against the annular nut 13.

It will be noted that the collar portion 17 provides an opening through the piston 10 of substantially the diameter of the passage 6.

The outer end of the hollow piston has a spherical recess or socket, in which is adapted to fit an oscillating gasket 21, preferably made of a heat-resistant material, such as brass or steam metal. The gasket 21 may be of the usual oscillating type, comprising a ring having a flat outer seating face 22 which normally extends beyond the conduit opening, and a substantially spherical, convex surface area 23 adapted to rock in the socket of the hollow piston 10.

A spring member 25 is provided for holding the gasket 21 in its socket, said member being preferably made of a wire bent into the form of a flat-sided loop having a central curvature which may extend into the passage 6, and two opposite curvatures 26 and 27 adapted to be sprung into a shallow, annular groove in the collar portion 17 of the hollow piston 10, thereby maintaining the gasket in operable engagement with said piston. The opposite ends of spring member 25 adjacent the curvatures 26 and 27 are formed as eyes and are loosely fitted to the parallel ends of a smaller, loop-shaped wire handle member 30, which is pivotally mounted in the gasket 21 on a diametric axis, so as to permit said gasket to tilt or rock in its socket. This handle member affords a convenient means of removing the gasket when desired.

When a pair of coupling heads are connected in coupled position, the seating face 22 of gasket 21 engages the corresponding seating face of the counterpart coupling, and as the coupling heads are drawn together, the pressure exerted against said gasket 21 causes it to move inwardly, thereby forcing the hollow piston 10 to an inward position in relation to the bushing 8, against the opposing pressure of the spring 14, the action of which is thus directed toward maintaining said gasket firmly seated on the counterpart gasket.

As the distance between the faces of connected coupling heads is widened, the spring 14 moves piston 10 and gasket 21 to take up the slack space, thus automatically compensating for any wear of locking latches or other engaged members of the coupling heads. In case the connected couplings are imperfectly aligned or are flexed, the pressure of the spring 14 on the hollow piston 10 acts to maintain the gasket 21 and the counterpart gasket engaged, while the gasket 21 is rocked in the socket of said piston so as to maintain its seating face in parallel engagement with that of the counterpart gasket.

It will thus be evident that the improved gasket assembly constructed according to my invention is rendered automatically adjustable to compensate for unequal spreading between the connected coupling heads caused by wear or play between the parts, so as to maintain a substantially leak-tight seal.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a conduit coupling device, in combination, a coupling head having a fluid passage formed therethrough and a bore connected with said passage and opening at a lateral face of said head, a sleeve member slidably mounted in the bore and having a spherical recess at its outer end surrounding the opening therethrough, an annular gasket arranged to oscillate in the recess of said sleeve member and having a flat seating face adapted to extend outwardly of the lateral face of the coupling head, means associated with said head for limiting outward movement of said sleeve member, and a spring acting on said sleeve member to urge it outwardly toward the lateral face of said coupling head.

2. In a conduit coupling device, in combination, a coupling head having a fluid passage formed therethrough and a bore connected with said passage and opening at a lateral face of said head, a sleeve member slidably mounted in the bore and having a concave sealing face at its outer end surrounding the opening therethrough, an annular gasket having a convex sealing face substantially complementary to said sealing face of the sleeve member, said gasket being removably mounted to oscillate on said sleeve member, an annular abutment fixed in the coupling head at the opening of the bore and having a shoulder adapted to engage the sleeve member while clearing the outer seating face of said gasket, and a spring interposed between the coupling head and said sleeve member for urging said member outwardly toward said shoulder.

ANTON K. KUSEBAUCH.